United States Patent
Yamakawa et al.

(10) Patent No.: US 8,894,292 B2
(45) Date of Patent: Nov. 25, 2014

(54) SPLIT OUTER RING, SPLIT ROLLING BEARING USING THE SAME RING AND CONSTRUCTION AND METHOD OF MOUNTING THE SAME ROLLING BEARING

(75) Inventors: Kazuyoshi Yamakawa, Nishinomiya (JP); Junji Murata, Kashiba (JP); Toshiyuki Saito, Kashiba (JP); Takashi Sada, Kashiwara (JP); Naoki Tani, Kashiwara (JP)

(73) Assignee: Jtekt Corporation, Osaka-Shi, Osaka (JP)

( * ) Notice: Subject to any disclaimer, the term of this patent is extended or adjusted under 35 U.S.C. 154(b) by 617 days.

(21) Appl. No.: 12/736,880
(22) PCT Filed: May 18, 2009
(86) PCT No.: PCT/JP2009/059129
§ 371 (c)(1),
(2), (4) Date: Nov. 18, 2010
(87) PCT Pub. No.: WO2009/142172
PCT Pub. Date: Nov. 26, 2009

(65) Prior Publication Data
US 2011/0064350 A1   Mar. 17, 2011

(30) Foreign Application Priority Data

May 19, 2008  (JP) ................. 2008-130839
Sep. 16, 2008  (JP) ................. 2008-236424
Nov. 14, 2008  (JP) ................. 2008-292292

(51) Int. Cl.
F16C 33/58  (2006.01)
F16C 33/60  (2006.01)
F16C 19/46  (2006.01)
F16C 9/02   (2006.01)

(52) U.S. Cl.
CPC . *F16C 9/02* (2013.01); *F16C 33/60* (2013.01); *F16C 2240/46* (2013.01); *F16C 19/466* (2013.01)

USPC ............................................ 384/570
(58) Field of Classification Search
USPC ......... 384/499, 501, 502, 505, 506, 548, 569, 384/570
See application file for complete search history.

(56) References Cited

U.S. PATENT DOCUMENTS 2,528,987 A * 11/1950 Albett .......................... 384/570
2,682,435 A *  6/1954 Rien et al. .................... 384/562
(Continued)

FOREIGN PATENT DOCUMENTS

FR    627 699 (A)      10/1927
JP    55-149418 A      11/1980
(Continued)

OTHER PUBLICATIONS

Translation of JP2007-002914 obtained Jun. 10, 2013.*
(Continued)

*Primary Examiner* — James Pilkington
(74) *Attorney, Agent, or Firm* — McGinn IP Law Group, PLLC

(57) ABSTRACT

A split outer ring of a split rolling bearing, which splits in a radial direction, includes a pair of split outer ring members which are each formed into a semi-cylindrical shape and which are formed into a cylindrical shape by being butted against each other at circumferential end portions. A pair of first flat plane portions which extend from both axial end edges of the end portions towards a center in parallel with an axis and a V-shaped recess portion, positioned between the first flat plane portions and is recessed in a circumferential direction relative to the pair of first flat plane portions, are formed at one end portion of the circumferential end portions which are butted against each other, and a pair of second flat plane portions which extend from the both axial end edges in parallel with the axis.

20 Claims, 17 Drawing Sheets

(56) References Cited

U.S. PATENT DOCUMENTS

| | | | |
|---|---|---|---|
| 3,166,363 A * | 1/1965 | Kay | 384/570 |
| 4,541,157 A * | 9/1985 | Tsushima et al. | 384/569 |
| 7,311,447 B2 | 12/2007 | Takeo et al. | |
| 8,128,291 B2 * | 3/2012 | Katayama et al. | 384/457 |
| 8,132,550 B2 * | 3/2012 | Oishi et al. | 384/419 |
| 8,136,998 B2 * | 3/2012 | Murata et al. | 384/570 |
| 2007/0153320 A1 | 7/2007 | Yamaoka | |
| 2008/0310787 A1 * | 12/2008 | Waseda et al. | 384/572 |
| 2009/0123104 A1 | 5/2009 | Abe et al. | |
| 2009/0126195 A1 | 5/2009 | Takeo et al. | |
| 2009/0235887 A1 | 9/2009 | Oishi et al. | |

FOREIGN PATENT DOCUMENTS

| | | |
|---|---|---|
| JP | 2005-90696 A | 4/2005 |
| JP | 2005-337352 A | 12/2005 |
| JP | 2006-125606 A | 5/2006 |
| JP | 2006-322580 A | 11/2006 |
| JP | 2006-336765 A | 12/2006 |
| JP | 2007-2914 (A) | 1/2007 |
| JP | 2007-247828 A | 9/2007 |
| JP | 2008-57740 A | 3/2008 |
| WO | WO 2007/013317 (A1) | 2/2007 |
| WO | WO 2008/029714 A1 | 3/2008 |

OTHER PUBLICATIONS

European Search Report dated Mar. 1, 2013.
Extended European Search Report dated Jun. 4, 2012.
Chinese Office Action dated Jul. 23, 2012, with English translation.
Japanese Office Action dated Dec. 17, 2012, with English translation.
Japanese Office Action dated Dec. 19, 2012, with English translation.

* cited by examiner (a)

(b)

SPLIT OUTER RING, SPLIT ROLLING BEARING USING THE SAME RING AND CONSTRUCTION AND METHOD OF MOUNTING THE SAME ROLLING BEARING

TECHNICAL FIELD

The present invention relates of a split rolling bearing which is interposed between a crankpin and a large end of a connecting rod of an internal combustion ending, for example, and a split outer ring for use in the same rolling bearing, and a construction and method of mounting such a rolling bearing.

BACKGROUND ART

In automotive or marine engines, since a bearing which supports a crankshaft for converting reciprocating motion of a piston into rotary motion is disposed between counterweights or a counterweight and a large end portion of a connecting rod, a split bearing is used which is split into two in a circumferential direction.

Conventionally, while slide bearings have been used as the supporting bearing described above, in recent years, there have been increasing demands for engines which consume less fuel. Due to these increasing demands, it has been proposed to use a bearing which is split in a circumferential direction in place of the slide bearing so as to decrease rotation loss (for example, refer to Patent Document 1).

Patent Document 2 describes an example in which a split bearing is interposed between a crankpin and a large end portion of a connecting rod of an internal combustion engine. This split bearing has a split outer ring which is inscribed in an inner circumferential surface of the large end portion of the connecting rod and a plurality of rollers which are disposed rollingly between an inner circumferential surface of the split bearing and an outer circumferential surface of the crankpin. The split outer ring is configured so as to be split by combining together a pair of split outer ring members which are each formed into a substantially semi-cylindrical shape. The split bearing can be split in a radial direction by employing the split outer ring which can be split apart and can be assembled to an outer circumferential side of the crankpin which is offset with respect to a rotating axis of a crankshaft.

Since the pair of split outer ring members are butted against each other at circumferential end portions thereof, there is a fear that an alignment error is caused as a result of the split outer ring members moving in an axial direction relatively to each other. Because of this, an angular projecting portion which projects in the circumferential direction is formed at one end portion, and a V-shaped recess portion which corresponds to the projecting portion is formed at the other end portion of the circumferential end portions which are butted against each other, whereby the axial relative movement of the pair of split outer ring members is prevented by those projecting portion and the recess portion being brought into engagement with each other.

In addition, in the split rolling bearing, while the circumferential end faces of the set of two split outer rings are brought into abutment with each other to form a mating surface, there may occur a radial alignment error between the facing end portions of the outer rings at the mating surface due to an assemblage error of the rolling bearing to a housing which has a supporting hole where the rolling bearing is accommodated or the worked condition of a fitting surface of the housing. As a result, there may occur a case where a level difference which projects radially inwards is formed at the mating surface.

Then, as is shown in FIG. 17, in the event that a level difference 75 is produced in a radial direction (a vertical direction in FIG. 17) at a mating surface C between split outer rings 72a, 72b, when a roller 73 rolls near the mating surface C between the split outer rings where the level difference is being produced, a circumferential surface of the roller 73 is brought into collision with a corner 75a of the level difference 75, there being caused a fear that noise or vibration is generated.

Then, in order to suppress noise or vibration which would be caused in association with the passage of the roller over the level difference, it is proposed to form a "recess" or "flank" by setting back a raceway surface of the outer ring lying near the mating surface radially outwards (for example, refer to Patent Document 3).

In the bearing described in Patent Document 3, the V-shaped projecting portion is provided at the circumferential end portion of the one outer ring and the V-shaped recess portion is provided at the circumferential end portion of the other outer ring, the circumferential end portions forming the mating surface. Inclined surfaces (flanks) are formed on an inner circumferential surface side of each of the outer rings, which constitutes an outer ring raceway surface, at the respective circumferential end portions thereof so as to be inclined in a direction in which a radial thickness is gradually decreased towards circumferential distal-end edges of each of the outer rings. According to the bearing described in Patent Document 3, it is said that even in the event that a radial alignment error is generated at the mating surface of both the outer rings, the generation of a level difference can be prevented by the formation of the inclined surfaces, as a result of which the generation of noise or vibration is suppressed.

RELATED ART DOCUMENT

Patent Document

Patent Document 1: JP-A-2007-247828
Patent Document 2: JP-A-2005-90696
Patent Document 3: JP-A-2006-125606

SUMMARY OF THE INVENTION

Problem that the Invention is to Solve

In the conventional split bearings described above, since the recess portion at the end portion of the split outer ring member is cut to be formed into the V-like shape, stress is easily concentrated at a bottom portion of the V-shaped recess. In addition to this, since the split outer ring is attached to the inner circumferential surface of the large end portion of the connecting rod in a press fitted condition, stress is applied to the whole of the split outer ring in a direction in which the split outer ring is contracted diametrically. Because of this, when the split outer ring is attached to the large end portion of the connecting rod, a vertex portion of the triangular projecting portion which is fitted in the recess portion presses against the bottom portion of the recess portion. As this occurs, stress is concentrated at the bottom portion of the recess portion, whereby a crack is generated from the bottom portion as an origin to extend along a circumferential direction in the split outer ring member, which constitutes a cause for reduction of the durability of the split outer ring.

In addition, in the bearing described in Patent Document 3, the "flank" is made up of the inclined surface which reduces or increases the diameter of the outer ring linearly and gradually. However, in place of the flank so formed, it is considered to form a circular arc-shaped curved surface having an opposite curvature to that of the outer ring raceway surface at a radially inner side edge portion of the mating surface.

However, in the "flanks" which are made up of the inclined surface and the circular arc-shaped curved surface which were described above, since the velocity vector of the roller changes drastically at a joint point which constitutes a boundary between the inclined surface or the circular arc-shaped and the outer ring raceway surface, the generation of noise or vibration cannot be suppressed sufficiently.

The invention has been made in view of the situations described above, and an object thereof is to provide a split outer ring which can suppress the reduction in durability by preventing the generation of a crack in split outer ring members and can suppress largely the generation of noise or vibration which is caused in association with passage of rolling elements over a mating surface and a split rolling bearing which uses the split outer ring.

Means for Solving the Problem

With a view to attaining the object, according to a first aspect of the invention, there is provided a split outer ring for use in a split rolling bearing which can be split in a radial direction, the split outer ring having a pair of split outer ring members which are each formed into a semi-cylindrical shape and which are formed into a cylindrical shape by being butted against each other at circumferential end portions, wherein a pair of first flat plane portions which extend from both axial end edges towards a center in parallel with an axis and a V-shaped recess portion which is recessed in a circumferential direction relative to the pair of first flat plane portions between the first flat plane portions are formed at one end portion of the circumferential end portions which are butted against each other, and a pair of second flat plane portions which extend from both axial end edges in parallel with the axis so as to be brought into abutment with the pair of first flat plane portions and a projecting portion which is formed between the pair of second flat plane portions and which projects circumferentially into a shape which corresponds to the recess portion so as to be introduced into the recess portion are formed at the other end portion which is butted against the one end portion, and wherein a space is formed between the recess portion and the projecting portion so as to avoid a contact between a bottom portion of the recess portion and a vertex portion of the projecting portion.

According to the split outer ring which is configured as has been described above, since the space adapted to avoid the contact between the bottom portion of the recess portion and the vertex portion of the projecting portion is formed between the recess portion and the projecting portion, when the split outer ring is used in a split rolling bearing, even in the event that stress is applied to the whole of the split outer ring in a direction in which the split outer ring is contracted diametrically, the bottom portion of the recess portion can be prevented from being pressed against by the vertex portion of the projecting portion as a result of the vertex portion being brought into direct contact with the bottom portion. Further, since the stress can be borne by the first and second flat plane portions which are in abutment with each other, an excessive concentration of the stress at the bottom portion of the recess portion can be prevented.

Thus, according to the aspect of the invention, the bottom portion of the recess portion can be prevented from being pressed against by the vertex portion of the projecting portion while an excessive concentration of the stress at the bottom portion of the recess portion is prevented. As a result of this, the generation of a crack in the split outer ring members which extends from the bottom portion as an origin.

More specifically speaking, the space is preferably formed by forming the vertex portion of the projecting portion into a curved surface. As this occurs, the space can be provided between the recess portion and the projecting portion by the simple method of providing the curved surface at the vertex portion of the projecting portion.

In addition, the space can also be formed by a fill cut-out portion which is provided at the bottom portion of the recess portion. As this occurs, similarly to the above configuration, the space can be provided between the recess portion and the projecting portion by the simple method.

The space may be such as to be formed by making a vertex angle of the projecting portion larger than an internal angle of the recess portion.

As this occurs, since the space can be provided not only between the bottom portion of the recess portion and the vertex portion of the projecting portion but also over almost a whole area defined between the recess portion and the projecting portion, an excessive concentration of the stress at the recess portion can be prevented more effectively.

A curved surface portion may be formed on an inner circumferential side of the end portion of each of both the split outer ring members so as to be tapered towards a circumferential distal-end edge of the end portion. It is preferable that these curved surface portions configure a clearance groove which is recessed radially outwards relative to a locus of the raceway surface when both the end portions are butted against each other so as to be formed into the split outer ring and are provided to extend over a whole area of the raceway surface in the axial direction.

Further, a sectional shape of the clearance groove is a concavely curved surface having a predetermined R dimension (radius of curvature) in which a center is positioned on a radial line which passes through a boundary between both the end portions and is set so that the clearance groove is positioned within a predetermined circumferential range L. In this case, the range L is set so that inner circumferential sides of the recess portion and the projecting portion constitute part of the clearance groove. By adopting this configuration, the clearance groove is provided over a whole boundary area of both the end portions which includes the boundary between the recess portion and the projecting portion, whereby a contact bearing pressure which is applied to the cylindrical roller which passes over the clearance groove from the raceway surface and an outer circumferential surface of the crankpin can be reduced. As a result of this, the generation of vibration or the like which occurs when the cylindrical roller passes over the boundary of both the end portions can be prevented effectively.

According to another aspect of the invention, there is provided a split rolling bearing adapted to be split in a radial direction and having a split outer ring made up of a pair of split outer ring members which are each formed into a semi-cylindrical shape and which are formed into a cylindrical shape by being butted against each other at circumferential end portions, a plurality of rolling elements which are aligned on an inner circumferential surface side of the outer ring, and a cage for holding the plurality of rolling elements so that the respective rolling elements are disposed at substantially equal intervals in a circumferential direction, wherein the split outer ring is the split outer ring described above.

According to the split rolling bearing that is configured as has been described above, by employing the split outer ring described above, the generation of a crack in the split outer ring members can be prevented. As a result of this, the reduction in durability of the split rolling bearing can be prevented.

According to a further aspect of the invention, there is provided a split rolling bearing comprising a split outer ring made up of a pair of split outer ring members which are each formed into a semi-cylindrical shape and which are formed into a cylindrical shape by being butted against each other at circumferential end portions, a plurality of rolling elements which are aligned on an inner circumferential surface side of the outer ring, and a cage for holding the plurality of rolling elements so that the respective rolling elements are disposed at substantially equal intervals in a circumferential direction and having a shaft which is fitted therein, wherein in a flank formed on a radially inner side edge portion of a circumferential end face of the split outer ring, a sectional shape of the flank within at least a range where the rolling elements are brought into contact is made up of an easement curve.

In the split rolling bearing, in the flank formed on the radially inner side edge portion of the circumferential end face of the split outer ring, since the sectional shape of the flank within at least the range where the rolling elements are brought into contact therewith (the sectional shape of the flank which is perpendicular to the axial direction of the split rolling bearing) is made up of the easement curve, a velocity vector of the rolling element near a boundary (a joint point) between a curved surface made up of the easement curve and an outer ring raceway surface changes gradually. Because of this, the generation of vibration or noise which is attributed to a drastic change in velocity vector of the rolling element can be suppressed, thereby making it possible to suppress largely the generation of vibration or noise which is caused in association with the passage of the rolling element over the mating surface.

The easement curve can be a clothoid curve or a cubic parabola. As this occurs, the velocity vector of the rolling element near the joint point can be changed gradually, thereby making it possible to suppress largely the generation of vibration or noise which is attributed to a drastic change in velocity vector of the rolling element.

According to an aspect of the invention, there is provided a bearing construction comprising the split rolling bearing and a housing having a supporting hole which supports the split rolling bearing in a closely contacting condition.

In the bearing construction of the invention, since the split rolling bearing is employed, the velocity vector of the rolling element near the joint point can be changed gradually, thereby making it possible to suppress largely the generation of noise or vibration which is caused in association with the passage of the rolling element over the mating surface.

According to another aspect of the invention, there is provided a mounting construction of a rolling bearing on a shaft portion of a crankshaft, wherein the rolling bearing is the split rolling bearing and comprises further a set of two split inner rings which are mounted on an outer circumferential surface of the shaft portion and which are split in a circumferential direction, and wherein the two split inner rings are held while being clamped in the axial direction by crank arms therebetween which are disposed at both axial sides of the shaft portion.

Normally, a journal portion of a crankshaft does not have a performance such as wear resistance which is required for an inner ring of a rolling bearing and has a problem inherent therein that separation or wear is generated in an early stage. Because of this, although it is considered that an inner ring is mounted in the journal portion separately, since crank arms are present at axial ends of the journal portion, the inner ring needs to have a similar split construction to that of the outer ring. Further, the inner ring is required to be mounted strongly and rigidly in the journal portion so that no creep is generated. However, since the inner ring having the split construction cannot be brought into strong press contact with the journal portion, it is difficult that the split inner ring is strongly and rigidly mounted in the journal portion.

By adopting the configuration described above, since the split inner rings are held while being clamped in the axial direction by the crank arms therebetween which are disposed at the axial sides of the shaft portion, the split inner rings can be mounted on the shaft portion strongly and rigidly, thereby making it possible to suppress the generation of creeping of the split inner rings relative to the shaft portion.

In the configuration described above, circumferential surfaces are preferably formed at a circumferential end portion of one of the split inner rings and a circumferential end portion of the other split inner ring so as to be brought into press contact with each other in the axial direction by a pressure exerted by the split inner rings which are clamped by the crank arms. As this occurs, since the two split inner rings are brought into press contact with each other in the axial direction on the surface extending in the circumferential direction, the relative position of the two split inner rings is fixed strongly and rigidly. Consequently, even with the split inner rings adopted, the split inner rings can be mounted on the shaft portion of the crankshaft more strongly and rigidly.

According to a further aspect of the invention, there is provided a method for mounting the rolling bearing on a shaft portion of a crankshaft, wherein an axial interference is set between an axial dimension of the two split inner rings and an axial space of the crank arms which are disposed at the axial sides of the shaft portion, and the two split inner rings are inserted between the crank arms so as to be mounted on the shaft portion through cooling fit of the two split inner rings or shrink fit of the shaft portion.

The split inner ring can be mounted on the shaft portion of the crankshaft strongly and rigidly by the mounting method described above.

Advantage of the Invention

According to the split outer ring and the split rolling bearing of the invention, not only can the generation of noise or vibration which is caused by the passage of the rolling elements over the mating surface be suppressed largely, but also the generation of a crack in the split outer ring members can be prevented, thereby making it possible to suppress the reduction in durability of the split outer ring and hence of the split rolling bearing.

MODE FOR CARRYING OUT THE INVENTION

First Embodiment

Figure 1:
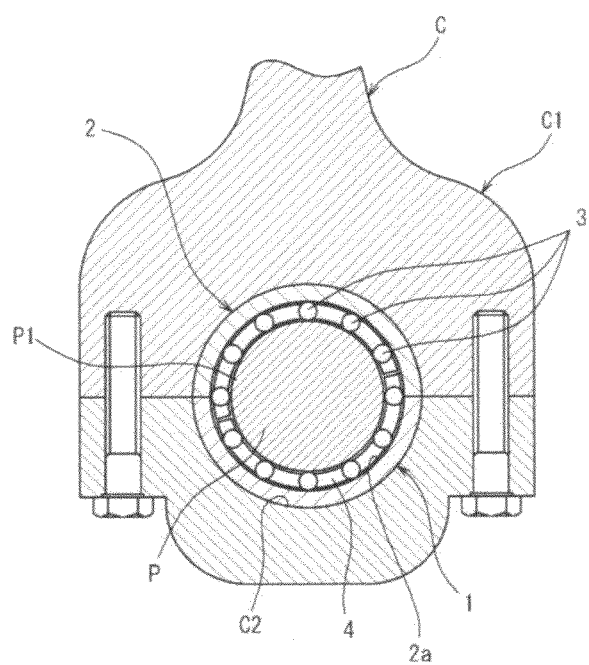
FIG. 1 A side view showing the construction of a split bearing according to a first embodiment of the invention.

Next, preferred embodiments of the invention will be described by reference to the accompanying drawings. FIG. 1 is a side view showing the construction of a split rolling bearing according to a first embodiment of the invention. This split rolling bearing 1 is interposed, for example, between an outer circumference of a crankpin P and an inner circumference of a large end portion C1 of a connecting rod C of an internal combustion engine and supports the connecting rod C so as to oscillates freely relative to the crankpin P.

This split rolling bearing 1 has a split outer ring 2 which is inscribed in an inner circumferential surface C2 of the large end portion C1, a plurality of cylindrical rollers 3 which are disposed rollingly between a raceway surface 2a which is formed on an inner circumferential side of the split outer ring 2 and an outer circumferential surface P1 of the crankpin P and a split cage 4 for holding the cylindrical rollers 3 so that the cylindrical rollers 3 are disposed at equal intervals in a circumferential direction. The split outer ring 2 and the split cage 4 are allowed to be split in a radial direction, and the split rolling bearing 1 is also allowed to be split in the radial direction.

The split rolling bearing 1 is interposed within the inner circumferential surface C2 in a press fitted condition. Because of this, stress is exerted on the split outer ring 2 in a direction in which the outer ring 2 is contracted diametrically when it is built in the large end portion C1 of the connecting rod C as the split rolling bearing 1.

Figure 2:
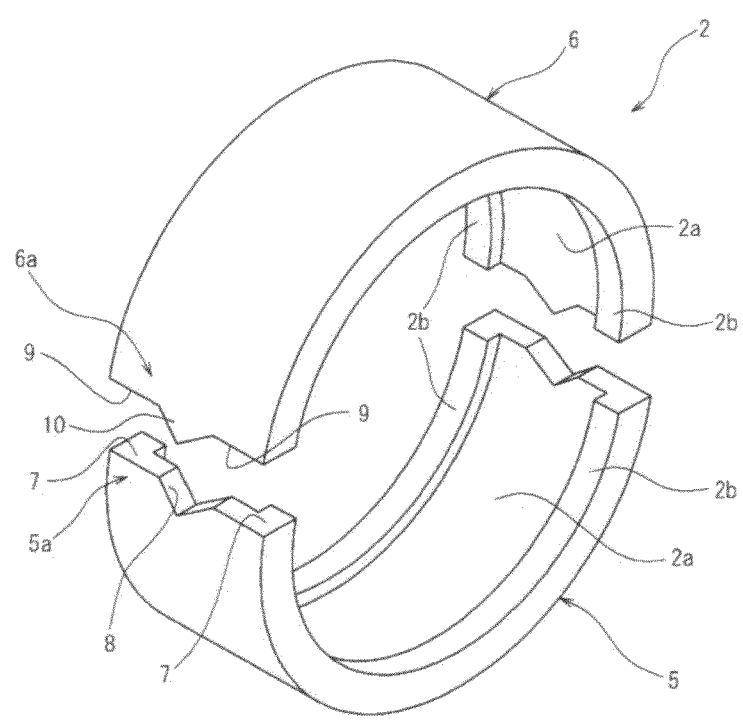
FIG. 2 A perspective view showing a split outer ring.

FIG. 2 is a perspective view showing the split outer ring 2. This split outer ring 2 has a first split outer ring member 5 and a second split outer ring member 6 which are each formed into a substantially semi-cylindrical shape. This pair of first and second split outer ring members 5, 6 configures a cylindrical outer ring by respective circumferential end portions 5a, 6a of the pair of spit outer ring members 5, 6 being butted against each other. A rib portion 2b which projects radially relative to the raceway surface 2a is formed along a circumferential direction at each of axial end edges of an inner circumferential side of the split outer ring 2. The rib portions 2b restrict an axial movement of the cylindrical rollers 3 which are rolling elements disposed on the raceway surface 2a.

There are formed at the end portion 5a which is one end portion of the first split outer ring member 5 a pair of first flat plane portions 7 which extend from axial end edges of the first split outer ring member 5 towards a center thereof in parallel with an axis and a V-shaped recess portion 8 which is recessed in the circumferential direction relative to the first flat plane portions 7 between the pair of first flat plane portions 7.

In addition, there are formed at the end portion 6a which is the other end portion of the second split outer ring member 6 which is butted against the end portion 5a a pair of second flat plane portions 9 which extend from axial end edges of the second split outer ring member 6 in parallel with the axis and a projecting portion 10 which is formed between the pair of second flat plane portions 9 and which projects in the circumferential direction so as to be introduced into the recess portion 8 in the first split outer ring member 5.

The pair of first flat plane portions 7 and the pair of second flat plane portions 9 are brought into abutment with each other in such a state that both the end portions 5a, 6a are butted against each other. In addition, the projecting portion 10 has a shape which corresponds to the recess portion 8 in the first split outer ring member 5 (an angular shape). The recess portion 8 and the projecting portion 10 are shaped so as to match each other in such a state that both the end portions 5a, 6a are butted against each other. In this way, by providing the recess portion 8 and the projecting portion 10 in and on the end faces 5a, 6a, respectively, which match each other so that the projecting portion 10 is allowed to be introduced into the recess portion 8, an axial alignment error of the first split outer ring member 5 and the second split outer ring member 6 is prevented.

Figure 3:
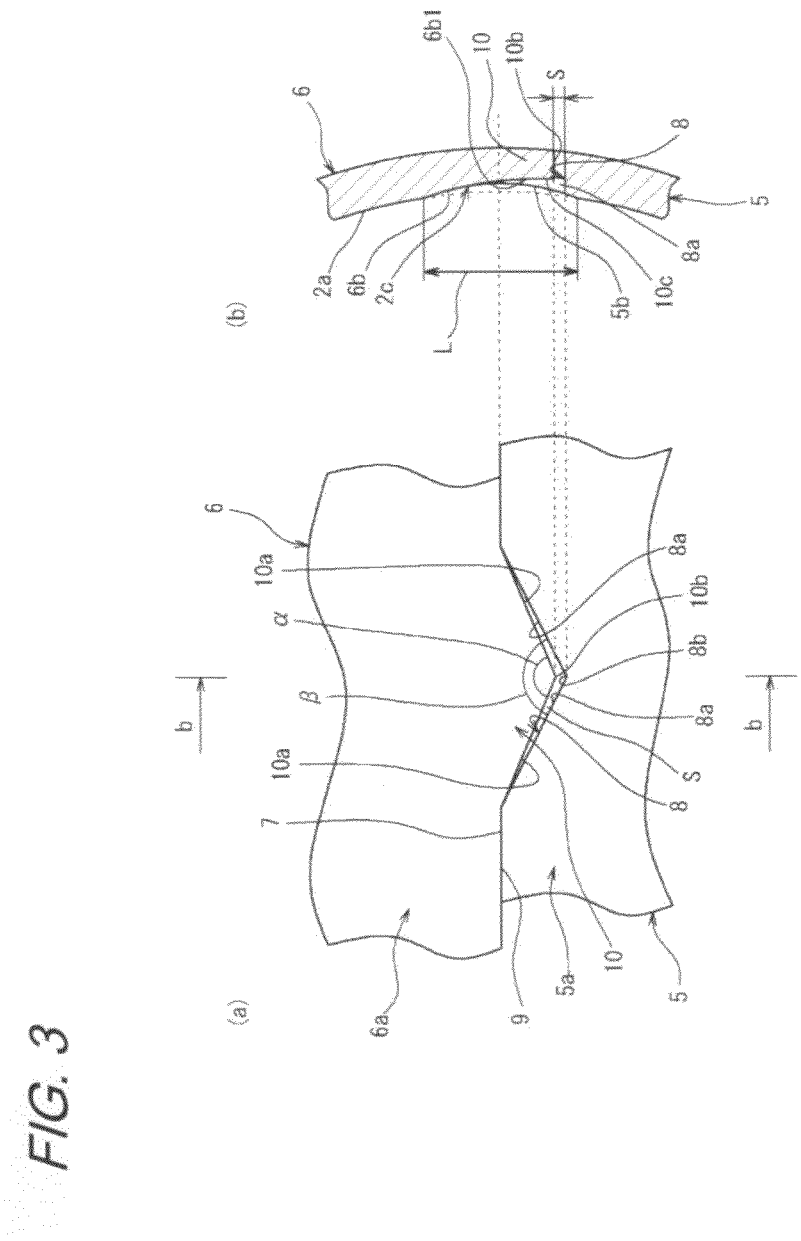
FIG. 3 Enlarged views of a main part of the split outer ring, in which (a) is a front view of a portion where split outer ring members are butted against each other at both end portions thereof as viewed from an outer circumferential side and (b) is a sectional view taken along the line b-b in FIG. 3(a) and viewed in a direction indicated by arrows b.

FIG. 3 show enlarged views of a main part of the split outer ring 2, in which (a) is a front view of a portion where both the end portions 5a, 6a are butted against each other as viewed from an outer circumferential side of the split outer ring 2, and (b) is a sectional view taken along the line b-b and viewed in a direction indicated by arrows b in FIG. 3(a).

In FIG. 3(a), both the flat plane portions 7, 9 of the split outer ring members 5, 6 are in abutment with each other as has been described above.

The recess portion 8 in the first split outer ring member 5 is formed into a V-shape by a pair of inclined wall surfaces 8a which are inclined rectilinearly from the first flat plane portions 7 in a direction in which the recess portion 8 is recessed in a circumferential direction, and a portion where the pair of inclined wall surfaces 8a intersect each other constitutes a bottom portion 8b of the recess portion 8.

On the other hand, the projecting portion 10 on the second split outer ring member 6 is formed into an angular shape by a pair of inclined side surfaces 10a which are inclined rectilinearly from the second flat plane portions 9 in a direction in which the projecting portion 10 projects in the circumferential direction, and a portion where the pair of inclined side surfaces 10a intersect each other constitutes a vertex portion 10b of the projecting portion 10.

The recess portion 8 and the projecting portion 10 are provided at substantially axial centers of the end portions 5a, 6a of the first and second outer ring members 5, 6, respectively, and are formed so as to be symmetrical with respect to the axial centers.

Here, in this embodiment, a vertex angle α of the projecting portion 10 which is an angle formed by the pair of inclined side surfaces 10a is set so as to take a larger value than an internal angle β of the recess portion 8 which is an angle formed by the pair of inclined wall surfaces 8a.

By setting the vertex angle α and the internal angle β in the way described above, a space S is formed as is shown in FIG. 3(a) between the projecting portion 10 and the recess portion 8. This space S is formed over almost a whole area defined between the projecting portion 10 and the recess portion 8 which includes a space defined between the bottom portion 8b of the recess portion 8 and the vertex portion 10b of the projecting portion 10, so as to avoid a contact of the vertex portion 10b of the projecting portion 10 with the bottom portion 8b of the recess portion 8.

The space S gradually decreases as it approaches a proximal end portion of the projecting portion 10, and the projecting portion 10 and the recess portion 8 are in contact with each other near the proximal end portion of the projecting portion 10. In this embodiment, by the projecting portion 10 being brought into contact with the recess portion 8 near the proximal end portion thereof, an axial alignment error of both the split outer ring members is prevented.

Note that the space S is preferably set at on the order of 60 µm at the most.

This is because in case the space S is set to be larger than that, there is a fear that the axial alignment error of the split outer ring members 5, 6 cannot be prevented effectively.

Curved surface portions 5b, 6b are formed on inner circumferential sides of the end portions 5a, 6a of the split outer ring members 5, 6, respectively, so as to be tapered towards circumferential distal end edges of the end portions 5a, 6a. These curved surface portions 5b, 6b configure a clearance groove 2c which is recessed radially outwards relative to a locus of the raceway surface 2a when the end portions 5a, 6a are butted against each other so that the split outer ring members 5, 6 are formed into the split outer ring 2. This clearance groove 2c is provided over a whole area of the raceway surface 2a in the axial direction.

A sectional shape of the clearance groove 2c is a concavely curved surface having a predetermined R dimension in which a center is positioned on a radial line which passes through a boundary between both the end portions 5a, 6a and is set so that the clearance groove 2c is positioned within a predetermined circumferential range L. In this case, the range L is set so that inner circumferential sides of the recess portion 8 and the projecting portion 10 constitute part of the clearance groove 2c. By adopting this configuration, the clearance groove 2c is provided over a whole boundary area of both the end portions 5a, 6a which includes the boundary between the recess portion 8 and the projecting portion 10, whereby a contact bearing pressure which is exerted on the cylindrical roller 3 which passes over the clearance groove 2c from the raceway surface 2a and an outer circumferential surface of the crankpin P can be reduced. As a result of this, the generation of vibration or the like which occurs when the cylindrical roller 3 passes over the boundary of both the end portions 5a, 6a can be prevented effectively.

A straight-line portion 6b1 which is made into a flat plane which extends further from the curved surface portion 6 in a tangent direction with respect to a locus of the clearance groove 2c as is shown in FIG. 3(b) is formed at a portion of the end portion 6 which is positioned on the inner circumferential side of the projecting portion. The straight-line portion 6b1 extends in the tangent direction with respect to the locus of the clearance groove 2c, and a inner circumferential side distal-end edge 10c is positioned further radially outwards than the locus of the clearance groove 2c.

By adopting this configuration, the inner circumferential side distal-end edge 10c is prevented from being brought into contact with the cylindrical rollers 3, thereby making it possible to prevent more effectively the generation of vibration or the like which occurs when the cylindrical rollers 3 pass over the boundary of both the end portions 5a, 6a.

According to the split outer ring 2 of the embodiment which is configured as has been described heretofore, even though stress is exerted on the whole of the split outer ring 2 in the direction in which the split outer ring 2 is contracted diametrically as a result of the split outer ring 2 being built in the bid end portion C1 of the connecting rod C, since the space S is formed between the bottom portion 8b of the recess portion 8 and the vertex portion 10b of the projecting portion 10 so as to avoid the contact of the vertex portion 10b with the bottom portion 8b, a direct contact of the vertex portion 10b of the projecting portion 10 with the bottom portion 8b of the recess portion 8 can be avoided, whereby the bottom portion 8b can be prevented from being pressed against by the vertex portion 10b. Further, since the stress can be borne by the first and second flat plane portions 7, 9 which are in abutment with each other, an excessive concentration of the stress at the bottom portion 8b of the recess portion 8 can be prevented.

Thus, according to the split outer ring 2 of the embodiment, the bottom portion 8b of the recess portion 8 can be prevented from being pressed against by the vertex portion 10b of the projecting portion 10 while an excessive concentration of the stress at the bottom portion 8b of the recess portion 8 is prevented. As a result of this, it is possible to prevent the generation of a crack in the first split outer ring member 5 which extends along the circumferential direction from the bottom portion 8 as an origin.

In the embodiment, by the projecting portion 10 being formed so that the vertex angle α thereof takes the larger value than the internal angle β of the recess portion 8, the space S can be provided not only between the bottom portion 8b of the recess portion 8 and the vertex portion 10b of the projecting portion 10 but also over almost the whole area defined between the recess portion 8 and the projecting portion 10. By adopting this configuration, an excessive concentration of the stress at the recess portion can be prevented more effectively. Note that even though the space S is provided over almost the whole area defined between the recess portion 8 and the projecting portion 10 in the way described above, since the proximal end portion of the projecting portion 10 is in contact with the recess portion 8, no axial alignment error of both the split outer ring members 5, 6 occurs in any way.

In the split rolling bearing 1 of the embodiment, by employing the split outer ring 2, the generation of a crack in the first split outer ring member 5 can be prevented. As a result of this, the reduction in durability of the split rolling bearing 1 can be prevented.

Second Embodiment

Figure 4:
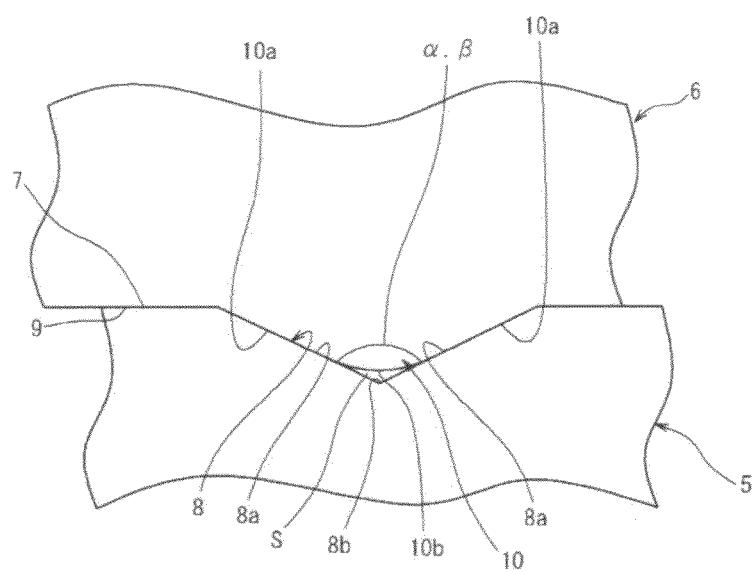
FIG. 4 An enlarged view of a main part of a split bearing according to a second embodiment of the invention, which shows a portion where split outer ring members are butted against each other at end portions thereof.

FIG. 4 is an enlarged view of a main part of a split rolling bearing 1 according to a second embodiment of the invention, which shows a portion where end portions 5a, 6a of outer ring members 5, 6 are butted against each other. This embodiment differs from the first embodiment mainly in that a space S is formed by making a vertex portion 10b of a projecting portion 10 into a curved surface.

In this embodiment, an internal angle β of a recess portion 8 and a vertex angle α of the projecting portion 10 are set at almost the same value, and inclined wall surfaces 8a of the recess portion 8 and inclined side surfaces 10a of the projecting portion 10 are in contact with each other.

In addition, the vertex portion 10b of the projecting portion 10 is made into the curved surface as has been described above, and a space S is formed between a bottom portion 8b of the recess portion 8 and the vertex portion 10b of the projecting portion 10.

In the case of this embodiment, too, a direct contact of the vertex portion 10b of the projecting portion 10 with the bottom portion 8b of the recess portion 8 can be avoided by the space S, whereby the bottom portion 8b can be prevented from being pressed against by the vertex portion 10b. Namely, with the space S formed at least between the bottom portion 8b and the vertex portion 10b, the generation of a crack in the first split outer ring 5 can be prevented which extends from the bottom portion 8b as an origin.

In this embodiment, the space S can be provided between the bottom portion 8b and the vertex portion 10b by the simple method in which the vertex portion 10b of the projecting portion 10 is made into the curved surface, which is advantageous in cost.

Third Embodiment

Figure 5:
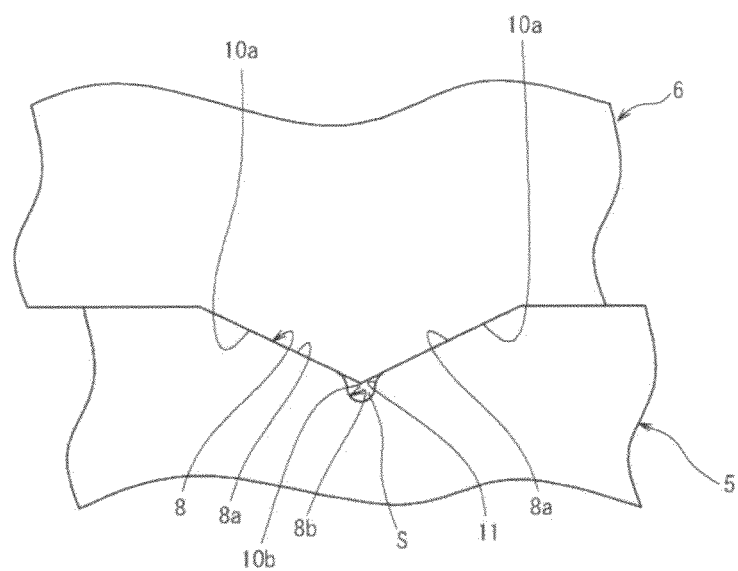
FIG. 5 An enlarged view of a main part of a split bearing according to a third embodiment of the invention, which shows a portion where split outer ring members are butted against each other at end portions thereof.

FIG. 5 is an enlarged view of a main part of a split rolling bearing 1 according to a third embodiment of the invention, which shows a portion where end portions 5a, 6a of split outer ring members 5, 6 are butted against each other.

This embodiment differs from the previous embodiments in that a space S is formed by a fill cut-out portion 11 provided in a bottom portion 8b of a recess portion 8.

The fill cut-out portion 11 is formed by recessing the bottom portion 8b further towards a circumferential direction from inclined wall surfaces 8a of the recess portion 8 and forms the space S between a vertex portion 10b of a projecting portion 10 and itself. In addition, an inner surface of this fill cut-out portion 11 is formed by a smooth curved surface so as to prevent the concentration of stress at a particular portion as much as possible.

In this embodiment, the space S can be provided between the bottom portion 8b and the vertex portion 10b by the simple method in which the fill cut-out portion is formed in the bottom portion 8b of the recess portion 8 and is advantageous in cost as with the second embodiment.

The invention is not limited to the respective embodiments that have been described heretofore. In those embodiments, while the pair of inclined wall surfaces 8a which configure the recess portion 8 and the pair of inclined side surfaces 10a which configure the projecting portion 10 are described as being formed so as to be inclined rectilinearly, the recess portion 8 and the projecting portion 10 may only have to be formed substantially into the V-like shape and the angular shape, respectively. Thus, the angular shape and the V-like shape includes, for example, a shape which is formed by convexly curving the inclined side surfaces 10a of the projecting portion as required and a shape which is formed by concavely curving the inclined wall surfaces 8a of the recess portion 8 in an opposed fashion, as is shown in FIG. 6(a).

Figure 6:
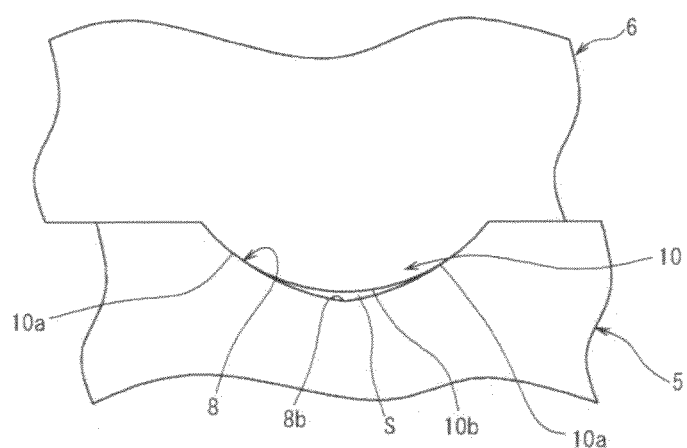
FIGS. 6 (a) and (b) show enlarged views showing main parts of other embodiments of the invention.
Figure 6:
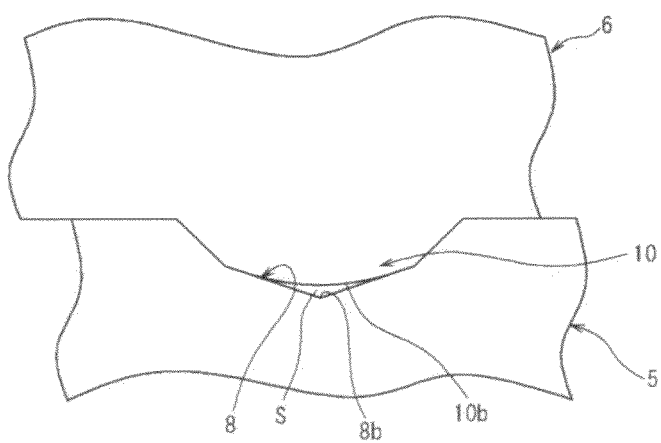

In addition, as is shown in FIG. 6(b), the inclination angles of the inclined wall surfaces 8a and the inclined side surfaces 10a can be changed at intermediate positions.

Fourth Embodiment

Figure 7:
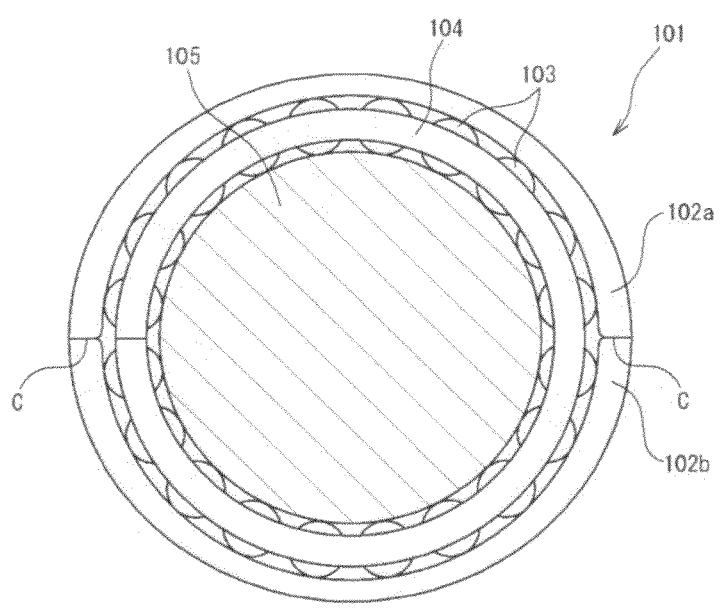
FIG. 7 An explanatory sectional view of a rolling bearing according to a fourth embodiment of the invention.
Figure 8:
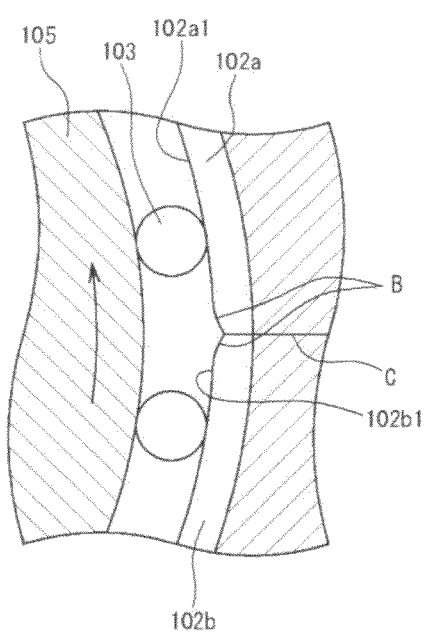
FIG. 8 An explanatory enlarged view showing a portion near a mating surface of the rolling bearing shown in FIG. 1.

FIG. 7 is an explanatory sectional view of a rolling bearing 101 according to a fourth embodiment of the invention, and FIG. 8 is an explanatory enlarged view of a portion lying near a mating surface of the rolling bearing 101 shown in FIG. 7. This rolling bearing 101 includes a pair of split outer rings (outer ring members) 102a, 102b which are each formed into a semi-cylindrical shape and which are split in a circumferential direction and are adapted to be butted against each other at circumferential end portions thereof so as to be formed into a cylindrical shape, a plurality of rolling elements or rollers 103 which are aligned on inner circumferential surface sides of the outer rings and are disposed so as to roll on respective inner surfaces of the split outer ring members 102a, 102b, and a cage 104 which holds the rollers 103 so that they are disposed at substantially equal intervals in the circumferential direction. A split portion is provided at one location along a circumferential direction of the cage 104, so that when built on a shaft 105, the cage 104 can be built on the shaft 105 by opening the split portion. However, the cage 104 may take the form of a split cage by providing split portions at two locations along the circumferential direction. The shaft 105 is fitted in the rolling bearing 101 by being supported by the plurality of rollers 103. This shaft 105 also functions as an inner ring.

A mating surface C is configured by a circumferential end face of the split outer ring member 102a and a circumferential end face of the split outer ring member 102b which faces the circumferential end face of the split outer ring member 102a. In this embodiment, as is shown in FIG. 8, a curved surface B which is a flank is formed at a radially inner side edge portion of each of the end faces of the split outer ring members 102a, 102b which configure the mating surface C, and a sectional shape of the curved surface B which lies within a range where the rollers 103 rollingly contact the same surface is made up of an easement curve. To be more specific, as is shown in FIG. 9(a), the sectional shape of the curved surface which lies within a range L which extends from the mating surface C to a joint point J which constitutes a boundary between each of raceway surfaces 102a1, 102b1 of the split outer ring members 102a, 102b and the curved surface B in the circumferential direction and a range h which so extends from the raceway surfaces 102a1, 102bs in a radial direction is made up of the easement curve. The magnitude of the L can be selected as required in accordance with the inside diameter of the respective raceway surfaces 102a1, 102b1 of the split outer ring members 102a, 102b or the diameter of the rollers 103. However, normally, assuming that the diameter of the roller 103 is referred to as D, the magnitude of the L is selected within a range where L is smaller than 2D. In addition, the magnitude of the h depends on a radial alignment error (a level difference) of the outer ring members at the mating surface C or the diameter of the rollers 103. However, normally, a value which is larger than the magnitude of the level difference is selected. In the event that the magnitude of the h is made to be larger than the magnitude of the level difference, at least the range where the rollers 103 are brought into contact is allowed to be made up of the easement curve.

A curved surface of the curved surface B which lies out of the range where the rollers 103 are brought into contact may be made up of a circular arc-like curved surface or a curved surface whose sectional shape is made up of an easement curve. Further, as the flank, a flank may be adopted which is made up of the curved surface of the invention which is made up of the easement curve and an inclined flat plane which follows a radially outer side (a housing side) of the curved surface.

By causing at least the range where the rollers 103 are brought into contact to be made up of the easement curve, a velocity vector of the roller 103 at the joint point J can be made small, thereby making it possible to suppress the generation of vibration or noise which is attributed to a drastic change in velocity vector. As such an easement curve, a typical clothoid curve (Cornu's spiral) can preferably be used. However, a cubic parabola which is similar to the clothoid curve can also be used.

Figure 9:
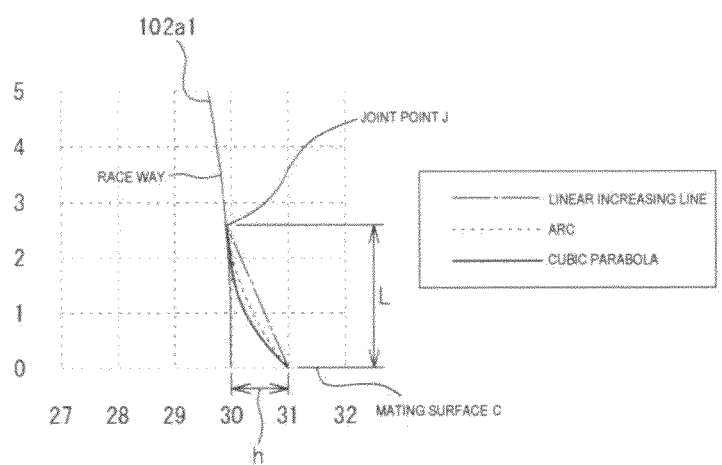
FIG. 9 Diagrams explaining inclinations of various types of recess portions relative to an outer ring raceway.
Figure 9:
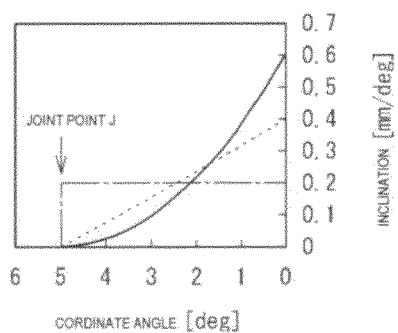

FIG. 9 shows diagrams which explain the inclination of various recess portions relative to the outer ring raceway, in which (a) shows sectional shapes of various recess portions, and (b) shows inclinations of various recess portions relative to the outer ring raceway. In FIG. 9, the diameter of the outer ring is referred to as 60 mm, the coordinate angle of the recess portion is referred to as 5 degrees, and the depth of the recess portion is referred to as 1 mm. A solid line denotes a cubic parabola (an easement curve), a broken line denotes a circular arc and a chain line denotes a linearly increasing line. In the linearly increasing line, the inclination of the flank relative to the outer ring is constant and 0.2 mm/degree from the mating surface C to the joint point J (In FIG. 9(a), a movement from bottom to top, and in FIG. 9(b), a movement from right to left), however the inclination becomes zero abruptly at the joint point J. In other words, the velocity vector of the roller which rolls on the linearly increasing line changes drastically at the joint point J. Because of this, large vibration or noise is generated when the rollers pass over the joint point. In addition, in the circular arc, the inclination from the mating surface C to the joint pint J decreases at a constant rate. However, the inclination changes largely at the joint point J, and although not to the level of the linearly increasing line, vibration or noise is generated when the rollers pass over the mating surface C. In contrast thereto, in the case of the cubic parabola, since the changing rate of the inclination decreases as it approaches the joint point J, a change in velocity vector of the roller when it passes over the joint point can be made small. As a result of this, the generation of vibration or noise which is attributed to the drastic change in velocity vector can be suppressed, thereby making it possible to suppress largely the generation of vibration or noise which occurs when the rollers pass over the mating surface.

Figure 10:
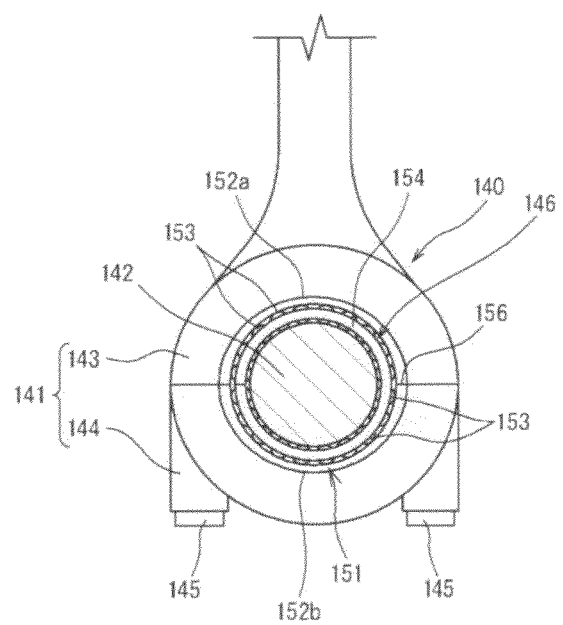
FIG. 10 An explanatory sectional view of a bearing construction of the fourth embodiment of the invention.

Next, a bearing construction of the fourth embodiment of the invention will be described. FIG. 10 is an explanatory sectional view of a large end portion of a connecting rod to which a bearing construction according to the fourth embodiment of the invention is applied. A connecting rod 104 is supported on a crankshaft 142 at a large end portion 141 thereof, and a piston, not shown, is attached to a small end portion, not shown, via a pin.

The large end portion 141 is constructed so that a cap portion 144 which is a second housing portion having a substantially semicircular recess portion in section is fixedly fastened to a main body portion 143 which is a first housing portion having a substantially semicircular recess portion in section with bolts 145 to thereby form a supporting hole 146 having a substantially circular section. A split rolling bearing 151 is built in the supporting hole 146 having the substantially semicircular section which is formed by the main body portion 143 and the cap portion 144.

This rolling bearing 151 includes a set of two split outer ring members 152a, 152b which are disposed closely in the supporting hole 146, a plurality of rolling elements or rollers 153 which are disposed rollingly on respective inner surfaces of the two split outer ring members 152a, 152b, and a cage 154 which holds the rollers 153 so that they are disposed at substantially equal intervals in a circumferential direction. The crankshaft 142 configures an inner ring member of the rolling bearing 151. In a flank formed at a radially inner side edge portion of a circumferential end face of each of the split outer ring members 152a, 152b, a sectional shape of the flank within at least a range where the rollers 153 are brought into contact is made up of a clothoid curve which is an easement curve.

Figure 11:
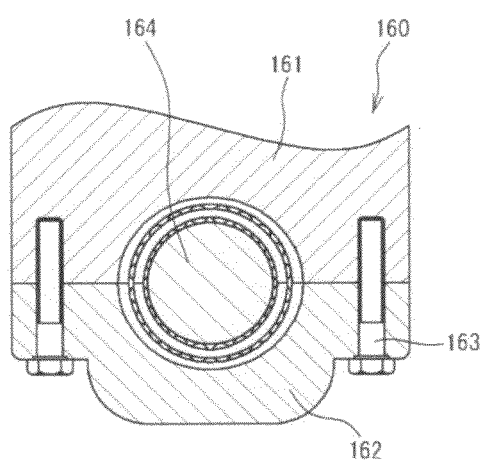
FIG. 11 An explanatory sectional view of a modified example of the bearing construction of the fourth embodiment of the invention.

In the embodiment shown in FIG. 10, while the bearing construction is applied to the large end portion of the connecting rod, as is shown in FIG. 11, the bearing construction can also be used as a crankshaft supporting bearing which is disposed within a supporting hole which is formed by an upper block 161 which is a housing which constitutes part of a crankshaft fixing portion 160 and a lower block 162 which is a housing connected integrally with the upper block 161. In FIG. 11, reference numeral 163 denotes a fixing bolt which fixes the upper block 161 and the lower block 162 together, and reference numeral 164 denotes a supporting shaft of a crankshaft.

In the embodiment described above, while the crankshaft is described as functioning as the shaft which is fitted in the bearing, the bearing construction of the invention can also be applied to other shafts including a camshaft.

In the embodiment described above, while the needle bearing is adopted which employs the rollers as rolling elements, a ball bearing can also be adopted which employs balls as rolling elements.

Fifth Embodiment

Figure 12:
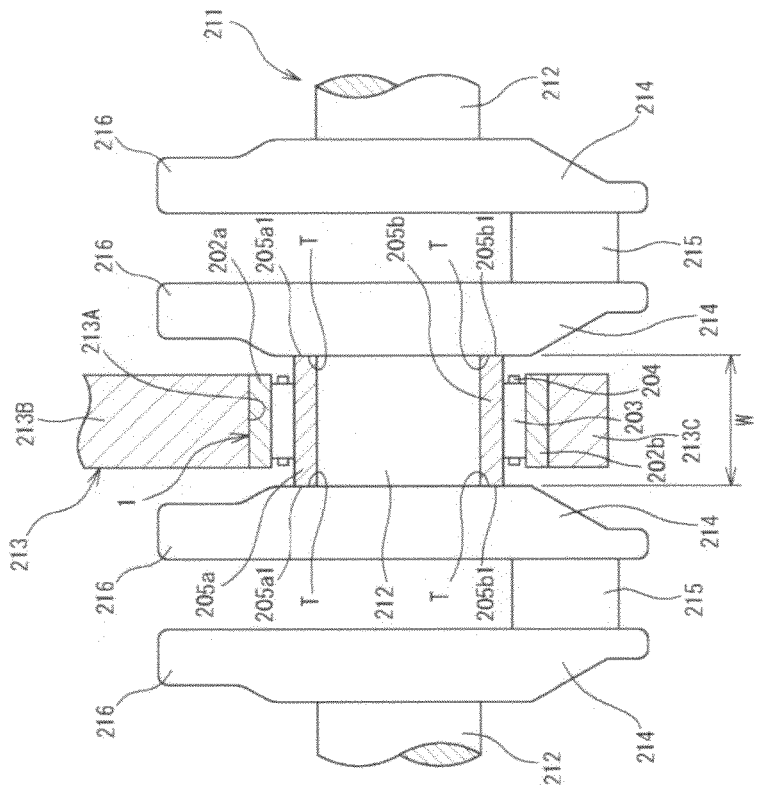
FIG. 12 A sectional front view of a rolling bearing according to a fifth embodiment of the invention.

FIG. 12 is a sectional front view of a bearing according to a fifth embodiment of the invention. A rolling bearing 201 of this embodiment is mounted on an outer circumferential surface of a journal portion 212 of a crankshaft 211 and is fitted in a supporting hole 213A in a housing 213 provided in a crankcase. The housing 213 includes an upper block 213B and a lower block 213C, and by bolting the lower block 213C to a lower side of the upper bock 213B, the supporting hole 213A is formed between both the blocks 213B, 213C.

The crankshaft 211 includes journal portions 212, crank arms 214, crankpins 215 and balance weights 216. The journal portions 212 are disposed in a rotating center position of the crankshaft 211 and are supported rotatably in the housing 213 via the rolling bearing 201. A plurality of crank arms 214 are disposed so as to be aligned at intervals in an axial direction and are connected to each other via the journal portions 212 and the crankpins 215. The crankpin 215 is provided at a front end portion of the crank arm 214, and the balance weight 216 is provided at a rear end portion of the crank arm 214. The balance weight 216 may be formed integrally with the crank arm 214 or formed separately from the crank arm 214.

Figure 13:
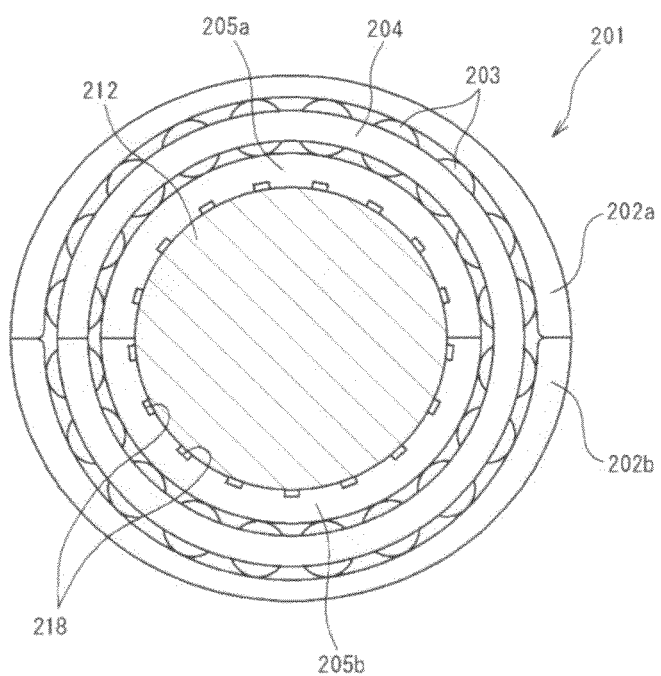
FIG. 13 A side view showing a rolling bearing shown in FIG. 12.

FIG. 13 is a side view of the rolling bearing 201. The rolling bearing 201 includes a set of two split outer rings (outer ring members) 202a, 202b which are split in a circumferential direction, a plurality of rolling elements or rollers 203 which are disposed rollingly on inner circumferential surfaces of the split outer ring members 202a, 202b, and a set of two split cages 204a, 204b which hold the rollers 203 so that they are disposed at substantially equal intervals in the circumferential direction. The rolling bearing 201 of this embodiment includes further a set of two split inner rings (inner ring members) 205a, 205b which are split in the circumferential direction. The split inner ring members 205a, 205b are fitted on an outer circumferential surface of the journal portion 212 on inner circumferential surfaces thereof, and the rollers 203 are disposed so as to roll on outer circumferential surfaces of the split inner ring members 205a, 205b. The cage is not limited to the cage which is constructed so as to be split at two locations but can have a ring construction in which the cage is split at one location in the circumferential direction so that the cage is mounted on outer circumferential sides of the split inner ring members 205a, 205b by opening the split location.

Figure 14:
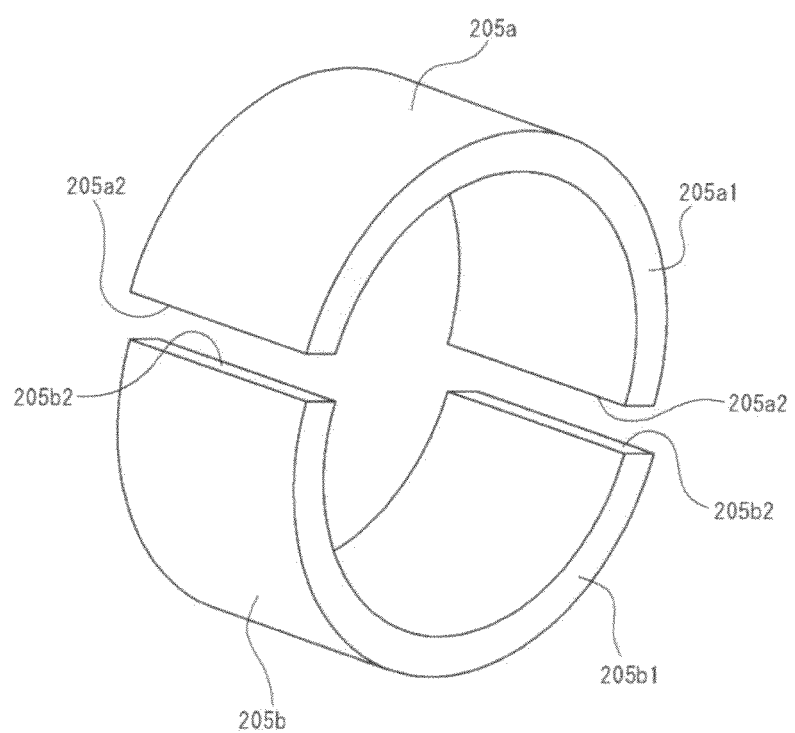
FIG. 14 An exploded perspective view showing split inner rings of the rolling bearing shown in FIG. 12.

FIG. 14 is an exploded perspective view of the split inner ring members 205a, 205b. The split inner ring members 205a, 205b are formed of a bearing steel of the SUJ2 grade and posses desired performances including hardness (for example, HRC 58 or larger), mechanical strength and wear resistance as a raceway of the rolling bearing 201. The split inner ring members 205a, 205b are each formed into a semi-arc-like shape, and circumferential end faces of the split inner ring members 205a, 205b constitute split surfaces 205a2, 205b2 which extend in a straight line along the axial direction. The two split inner ring members 205a, 205b are butted against each other at the split surfaces 205a2, 205b2 of circumferential ends thereof or face each other with a slight circumferential space defined therebetween.

As is shown in FIG. 12, inner circumferential diameters of the split inner ring members 205a, 205b are set at a substantially equal dimension to an outside diameter of the journal portion 212, so that inner circumferential surfaces of the split inner ring members 205a, 205b are attached closely to the outer circumferential surface of the journal portion 212. An axial length of the split inner ring members 205a, 205b is set to be slightly larger than an axial interval W defined between the crank arms 214 which are disposed at axial sides of the journal portion 212, and a predetermined interference is set between both the dimensions.

The split inner ring members 205a, 205b are mounted on the outer circumferential surface of the journal portion 212 through cooling fit or shrink fit. Namely, the split inner ring members 205a, 205b are fitted on the outer circumferential surface of the journal portion 212 in such a state that the axial dimension is contracted by being cooled or the split inner ring members 205a, 205 are fitted on the outer circumferential surface of the journal portion 212 in such a state that the space W between the crank arms 214 is expanded by heating the journal portion 212.

When the temperature of the split inner ring members 205a, 205b or the journal portion 212 gets back to the normal temperature, facing end faces T of the crank arms 214 are brought into press contact with axial end faces 205a1, 205b1 of the split inner ring members 205a, 205b, whereby the split inner ring members 205a, 205b are clamped to be held by the crank arms 214 by virtue of the frictional force generated therebetween.

Consequently, in the rolling bearing 201 of the embodiment, although they are constructed so as to be split, the inner ring members 205a, 205b can be fixedly mounted on the journal portion 212 strongly and rigidly, thereby making it possible to prevent the creeping of the split inner ring members 205a, 205b relative to the journal portion 212.

As is shown in FIG. 13, a number of thin grooves 218 which extend in the axial direction are formed on the inner circumferential surfaces of the split inner ring members 205a, 205b so as to be disposed at intervals in the circumferential direction, a circumferential resistance of the split inner ring members 205a, 205b against the journal portion 212 is increased by the thin grooves 218 so formed, the creeping of the split inner ring members 205a, 205b being thereby prevented.

By the rolling bearing 201 being made to include the split inner ring members 205a, 205b as is described in this embodiment, there is caused no such situation that the rollers 203 roll on the outer circumferential surface of the journal portion 212, thereby making it possible to prevent the wear or damage to the journal portion 212. In addition, even in the event that the rolling bearing 201 itself comes to an end of its life, since there is caused almost no damage to the journal portion 212, only the rolling bearing 201 in question has to be replaced.

By the rolling bearing 201 being made to include the split inner ring members 205a, 205b as is described in this embodiment, the split inner ring members 205a, 205b can be clamped to be held by the crank arms 214 therebetween, whereby no fastening devices such as bolts needs to be attached to the split inner ring members 205a, 205b. Because of this, the construction of the split inner ring members 205a, 205b can be simplified and the thickness of the split inner ring members 205a, 205b can be reduced, thereby making it possible to increase the diameter of the rollers 203 to such an extent that the thickness of the split inner ring members 205a, 205b are reduced, so as to improve the life of the rolling bearing 201.

Sixth Embodiment

Figure 15:
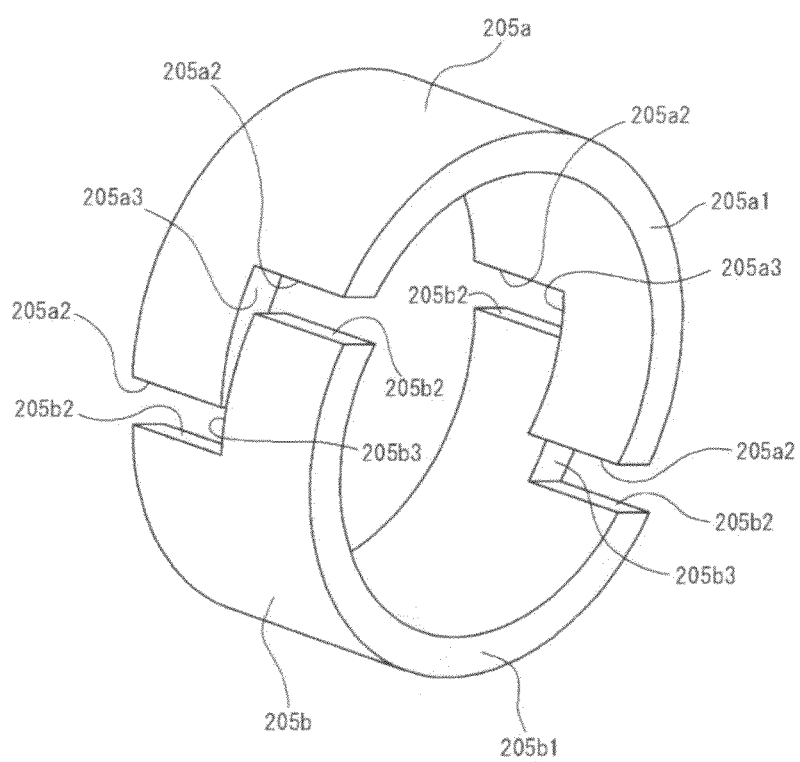
FIG. 15 An exploded perspective view showing a modified example of the split inner rings of the fifth embodiment.

FIG. 15 is an exploded perspective view showing another embodiment of split inner rings. Split inner ring members 205a, 205b of this embodiment are configured so that a circumferential end portion thereof is made to project in a circumferential direction on one axial side, while the other circumferential end portion is made to project in the circumferential direction on the other axial side, which is opposite to the one axial side above. Consequently, split surfaces of the circumferential end portions of the split inner ring members 205a, 205b include split surfaces 205a2, 205b2 which extend along the axial direction and split surfaces 205a3, 205b3 which extend along the circumferential direction (in a vertical direction to the axial direction), and these split surfaces are disposed into a substantially Z-like configuration (a crank-like configuration).

In this embodiment, the circumferential end portion of one split inner ring member 205a and the circumferential end portion of the other split inner ring member 205b are fitted in each other in an irregular fashion, whereby the split surfaces 205a3, 205b3 which extend in the circumferential direction are brought into surface contact with each other. Consequently, with axial end faces 205a1, 205b1 of the split inner ring members 205a, 205b clamped by the crank arms 214, the split surfaces 205a3, 205b3 which extend in the circumferential direction are brought into press contact with each other in the axial direction, whereby a relative position of the split inner ring members 205a, 205b is fixed strongly and rigidly by a frictional force produced therebetween. Consequently, in this embodiment, compared with the fourth embodiment, the split inner ring members 205a, 205b can be mounted on a journal portion 212 more strongly and rigidly.

Figure 16:
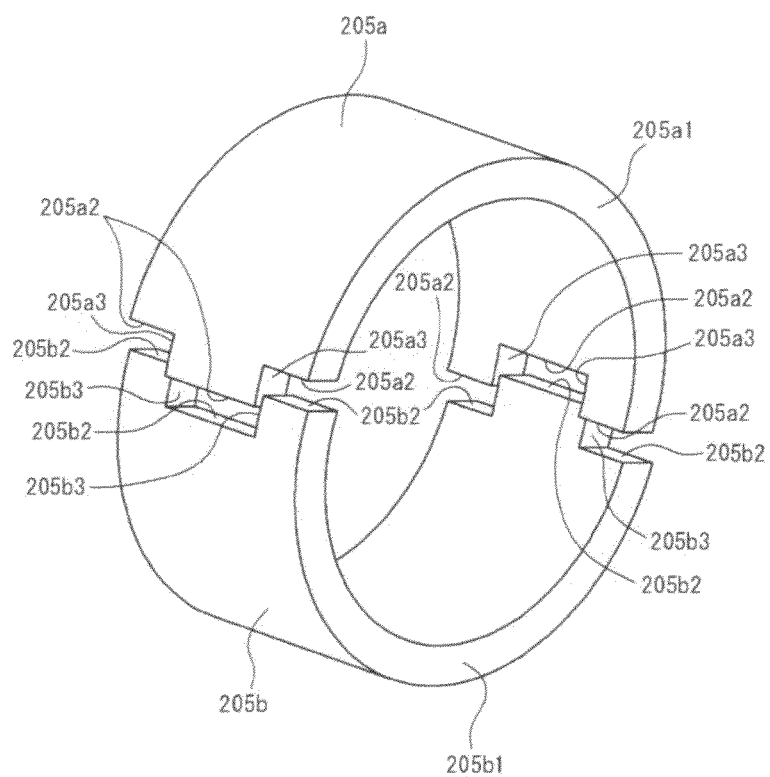
FIG. 16 An exploded perspective view showing another modified example of the split inner rings of the fifth embodiment.
Figure 17:
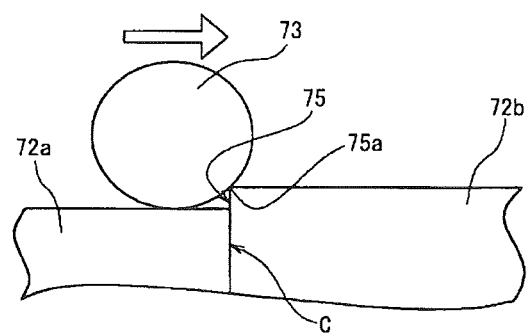
FIG. 17 An explanatory sectional view of a portion near a mating surface of a conventional split outer ring.

FIG. 16 is an exploded perspective view of a further embodiment of split inner rings. Split inner ring members 205a, 205b of this embodiment are configured so that a circumferential end portion thereof is made to project in a circumferential direction at an axial central portion, while the other circumferential end portion is recessed in the circumferential direction at an axial central portion. Consequently, split surfaces at the circumferential end portions of the split inner rig members 205a, 205b include split surfaces 205a2, 205b2 which extend in the axial direction and split surfaces 205a3, 205b3 which extend in the circumferential direction, and these split surfaces are disposed so as to be formed into a substantially projecting configuration and a substantially recessed configuration.

In this embodiment, too, the circumferential end portion of one split inner ring member 205a and the circumferential end portion of the other split inner ring member 205b are fitted in each other in an irregular fashion, whereby the split surfaces 205a3, 205b3 which extend in the circumferential direction are brought into surface contact with each other. Consequently, with axial end faces 205a1, 205b1 of the split inner ring members 205a, 205b clamped by the crank arms 214, the split surfaces 205a3, 205b3 which extend in the circumferential direction are brought into press contact with each other in the axial direction, whereby a relative position of the split inner ring members 205a, 205b is fixed strongly and rigidly by a frictional force produced therebetween. Consequently, in this embodiment, compared with the fourth embodiment, the split inner ring members 205a, 205b can be mounted on a journal portion 212 more strongly and rigidly.

The invention is not limited to the embodiments that have been described heretofore but can be altered as required with respect to the design thereof. For example, the invention can also be applied to an event in which a rolling bearing 201 is mounted on a crankpin 215 of a crankshaft 211. As this occurs, split inner ring members 205a, 205b of the rolling bearing 201 are fitted on an outer circumferential surface of the crankpin 215. Then, the split inner ring members 205a, 205b are clamped to be held by crank arms 214 therebetween which are disposed at axial sides of the crankpin 215, and outer circumferential surfaces of split outer ring members 202a, 202b of the rolling bearing 201 may be fitted in a large end portion of a connecting rod (whose illustration is omitted).

While the bearing systems in the embodiments that have been described heretofore include the needle bearing which employs the rollers as rolling elements, a ball bearing can be adopted which employs balls as rolling elements.

The invention claimed is:

1. A split outer ring of a split rolling bearing which splits in a radial direction, the split outer ring comprising:
a pair of split outer ring members which are each formed into a semi-cylindrical shape and which are formed into a cylindrical shape by being butted against each other at circumferential end portions,
wherein a pair of first flat plane portions which extend from both axial end edges of the end portions towards a center in parallel with an axis and a V-shaped recess portion, positioned between the first flat plane portions and is recessed in a circumferential direction relative to the pair of first flat plane portions, are formed at one end portion of the circumferential end portions which are butted against each other, and a pair of second flat plane portions which extend from said both axial end edges in parallel with the axis so as to be brought into abutment with the pair of first flat plane portions and a projecting portion which is formed between the pair of second flat plane portions and which projects circumferentially into a shape which corresponds to the recess portion so as to be introduced into the recess portion are formed at the other end portion which is butted against the one end portion, and
wherein a space is formed between the recess portion and the projecting portion so as to avoid a contact between a bottom portion of the recess portion and a vertex portion of the projecting portion.

2. A split outer ring as set forth in claim 1, wherein the space is formed by forming the vertex portion of the projecting portion into a curved surface.

3. A split outer ring as set forth in claim 2, wherein the space is formed by making a vertex angle of the projecting portion larger than an internal angle of the recess portion.

4. A split outer ring as set forth in claim 1, wherein the space is formed by making a vertex angle of the projecting portion larger than an internal angle of the recess portion.

5. A split outer ring as set forth in claim 1, wherein the space is formed by a fill cut-out portion which is provided at the bottom portion of the recess portion.

6. A split outer ring as set forth in claim 1, wherein a curved surface portion is formed on an inner circumferential side of the end portion of each of the pair of split outer ring members so as to be tapered towards a circumferential distal-end edge of the end portion.

7. A split outer ring as set forth in claim 6, wherein the curved surface portions configure a clearance groove which is recessed radially outwards relative to a locus of a raceway surface when the end portions of the pair of split outer ring members are butted against each other so as to be formed into the split outer ring, and the clearance groove is provided to extend over a whole area of the raceway surface in the axial direction.

8. A split outer ring as set forth in claim 7, wherein a sectional shape of the clearance groove comprises a concavely curved surface having a predetermined radius of curvature in which a center is positioned on a radial line which passes through a boundary between the end portions of the pair of split outer ring members and is set so that the clearance groove is positioned within a predetermined circumferential range, the range being set so that inner circumferential sides of the recess portion and the projecting portion constitute part of the clearance groove.

9. A split rolling bearing adapted to be split in a radial direction and comprising a split outer ring comprising a pair of split outer ring members which are each formed into a semi-cylindrical shape and which are formed into a cylindrical shape by being butted against each other at circumferential end portions, a plurality of rolling elements which are aligned on an inner circumferential surface side of the outer ring, and a cage for holding the plurality of rolling elements so that the respective rolling elements are disposed at substantially equal intervals in a circumferential direction,
wherein the split outer ring comprises the split outer ring set forth in claim 2.

10. A split rolling bearing adapted to be split in a radial direction and comprising a split outer ring comprising a pair of split outer ring members which are each formed into a semi-cylindrical shape and which are formed into a cylindrical shape by being butted against each other at circumferential end portions, a plurality of rolling elements which are aligned on an inner circumferential surface side of the outer ring, and a cage for holding the plurality of rolling elements so that the respective rolling elements are disposed at substantially equal intervals in a circumferential direction,
wherein the split outer ring comprises the split outer ring set forth in claim 4.

11. A split rolling bearing adapted to be split in a radial direction and comprising a split outer ring comprises a pair of split outer ring members which are each formed into a semi-cylindrical shape and which are formed into a cylindrical shape by being butted against each other at circumferential end portions, a plurality of rolling elements which are aligned on an inner circumferential surface side of the outer ring, and a cage for holding the plurality of rolling elements so that the respective rolling elements are disposed at substantially equal intervals in a circumferential direction, wherein the split outer ring comprises the split outer ring set forth in claim 1.

12. An assembly of a rolling bearing on a shaft portion of a crankshaft, wherein the rolling bearing comprises the split rolling bearing set forth in claim 11 and further comprises:

two ring halves which are mounted on an outer circumferential surface of the shaft portion and which are split in a circumferential direction, and wherein the two ring halves are held while being clamped in the axial direction by crank arms therebetween which are disposed at both axial sides of the shaft portion.

13. The assembly as set forth in claim 12, wherein circumferential surfaces are formed at a circumferential end portion of one of the two ring halves and a circumferential end portion of the other of the two ring halves so as to be brought into a press contact with each other in the axial direction by a pressure exerted by the two ring halves which are clamped by the crank arms.

14. An assembly of a rolling bearing on a shaft portion of a crankshaft, wherein the rolling bearing comprises the split rolling bearing set forth in claim 11 and further comprises:

a set of two split inner rings which are mounted on an outer circumferential surface of the shaft portion and which are split in a circumferential direction, and wherein an axial interference is set between an axial dimension of the two split inner rings and an axial space of crank arms which are disposed at the axial sides of the shaft portion, and the two split inner rings are inserted between the crank arms so as to be mounted on the shaft portion through a cooling fit of the two split inner rings or shrink fit of the shaft portion.

15. A split rolling bearing, comprising:

a split outer ring comprising a pair of split outer ring members which are each formed into a semi-cylindrical shape and which are formed into a cylindrical shape by being butted against each other at circumferential end portions, the pair of split outer ring members comprising:

a first member comprising a curved surface and a v-shaped projection; and a second member comprising another curved curve and a v-shaped recess;

a plurality of rolling elements which are aligned on an inner circumferential surface side of the outer ring; and a cage for holding the plurality of rolling elements so that the respective rolling elements are disposed at substantially equal intervals in a circumferential direction, and comprising a shaft which is fitted therein, wherein, in a flank formed on a radially inner side edge portion of an end face of the split outer ring, a sectional shape of the flank within at least a range where the rolling elements are brought into contact comprises an easement curve having a v-shaped profile at the radially inner side edge portion of the end face of the split outer ring formed by the curved surface of the first member and said curved surface of the second member.

16. A split rolling bearing as set forth in claim 15, wherein the easement curve comprises a clothoid curve or a cubic parabola.

17. An assembly comprising the split rolling bearing set forth in claim 15, and a housing comprising a supporting hole which supports the split rolling bearing in a contacting condition.

18. An assembly of a rolling bearing on a shaft portion of a crankshaft, wherein the rolling bearing comprises the split rolling bearing set forth in claim 15 and further comprises:

two ring halves which are mounted on an outer circumferential surface of the shaft portion and which are split in a circumferential direction, and wherein the two ring halves are held while being clamped in the axial direction by crank arms therebetween which are disposed at both axial sides of the shaft portion.

19. The assembly as set forth in claim 18, wherein circumferential surfaces are formed at a circumferential end portion of one of the split inner rings and a circumferential end portion of the other split inner ring so as to be brought into a press contact with each other in the axial direction by a pressure exerted by the split inner rings which are clamped by the crank arms.

20. An assembly of a rolling bearing on a shaft portion of a crankshaft, wherein the rolling bearing comprises the split rolling bearing set forth in claim 15 and further comprises:

a split inner ring which is mounted on an outer circumferential surface of the shaft portion and which is split in a circumferential direction, and wherein an axial interference is set between an axial dimension of the split inner ring and an axial space of crank arms which are disposed at the axial sides of the shaft portion, and the split inner ring is inserted between the crank arms so as to be mounted on the shaft portion through a cooling fit of the split inner ring or a shrink fit of the shaft portion.

\* \* \* \* \*